United States Patent [19]

Moore

[11] Patent Number: 5,472,255
[45] Date of Patent: Dec. 5, 1995

[54] SUN VISOR WITH SUN SCREENS FOR MOTOR VEHICLE

[76] Inventor: Thurman Moore, 1920 Heliotrope Dr., Santa Ana, Calif. 92706

[21] Appl. No.: 297,507

[22] Filed: Aug. 29, 1994

[51] Int. Cl.⁶ .................................................. B60J 3/02
[52] U.S. Cl. ................................ 296/97.6; 296/97.8
[58] Field of Search ........................... 296/97.6, 97.8, 296/97.9

[56] References Cited

U.S. PATENT DOCUMENTS

| | | | |
|---|---|---|---|
| 2,238,981 | 4/1941 | Newell | 296/97.8 |
| 2,517,872 | 8/1950 | Hamel | 296/97.6 |
| 2,823,950 | 2/1958 | Harris | 296/97.6 |
| 2,965,416 | 12/1960 | Dryden | 296/97.8 |
| 3,095,233 | 6/1963 | Dryden | 296/97.6 |
| 3,201,170 | 8/1965 | Weingarten | 296/97.6 |
| 3,371,955 | 3/1968 | Herrington, Sr. | 296/97.8 |
| 3,584,910 | 6/1971 | Lupul | 296/97.6 |
| 4,195,876 | 4/1980 | Timperio | 296/97.6 |
| 4,248,474 | 2/1981 | Mandrick | 296/97.6 |
| 4,666,205 | 5/1987 | Nakagawa | 296/97.6 |
| 4,681,363 | 7/1987 | Hemmeke et al. | 296/97.6 X |
| 4,690,450 | 9/1987 | Boerema et al. | 296/97.9 |
| 4,824,161 | 4/1989 | Lee | 296/97.8 |
| 4,861,091 | 8/1989 | Wallen | 296/97.8 X |
| 4,913,483 | 4/1990 | Jasso | 296/97.8 X |
| 4,923,238 | 5/1990 | Morgulis et al. | 296/97.6 |
| 4,950,021 | 8/1990 | Vandagriff | 296/97.6 |
| 5,076,633 | 12/1991 | Hsu et al. | 296/97.8 X |
| 5,080,420 | 1/1992 | Hemmeke et al. | 296/97.9 X |
| 5,098,149 | 3/1992 | Lee | 296/97.6 |
| 5,127,700 | 7/1992 | Joe et al. | 296/97.9 X |
| 5,133,585 | 7/1992 | Hassan | 296/97.8 X |
| 5,135,279 | 8/1992 | Beatty | 296/97.8 X |
| 5,165,748 | 11/1992 | O'Connor | 296/97.8 X |
| 5,213,389 | 5/1993 | Loftis et al. | 296/97.8 X |

FOREIGN PATENT DOCUMENTS

| | | | |
|---|---|---|---|
| 1132147 | 3/1957 | France | 296/97.6 |
| 820386 | 11/1951 | Germany | 296/97.8 |
| 119416 | 5/1989 | Japan | 296/97.8 |
| 293222 | 11/1989 | Japan | 296/97.8 |

*Primary Examiner*—Joseph D. Pape
*Attorney, Agent, or Firm*—Plante & Strauss

[57] ABSTRACT

There is disclosed a sun visor which has a retractable sun screen for a motor vehicle. The sun visor has an expanded width and length and which is foldable for full retraction from the windshield or side window of the vehicle, and has a retractable sun screen which in various embodiments can be retracted by rolling up into the visor, or can be folded and secured in the sun visor in a folded configuration. In either embodiment, the visor has a main panel which can be deployed beside the windshield of a motor vehicle and a second panel which can be deployed beside the front window of the vehicle to afford the driver, or front seat passenger full protection against the sun.

4 Claims, 4 Drawing Sheets

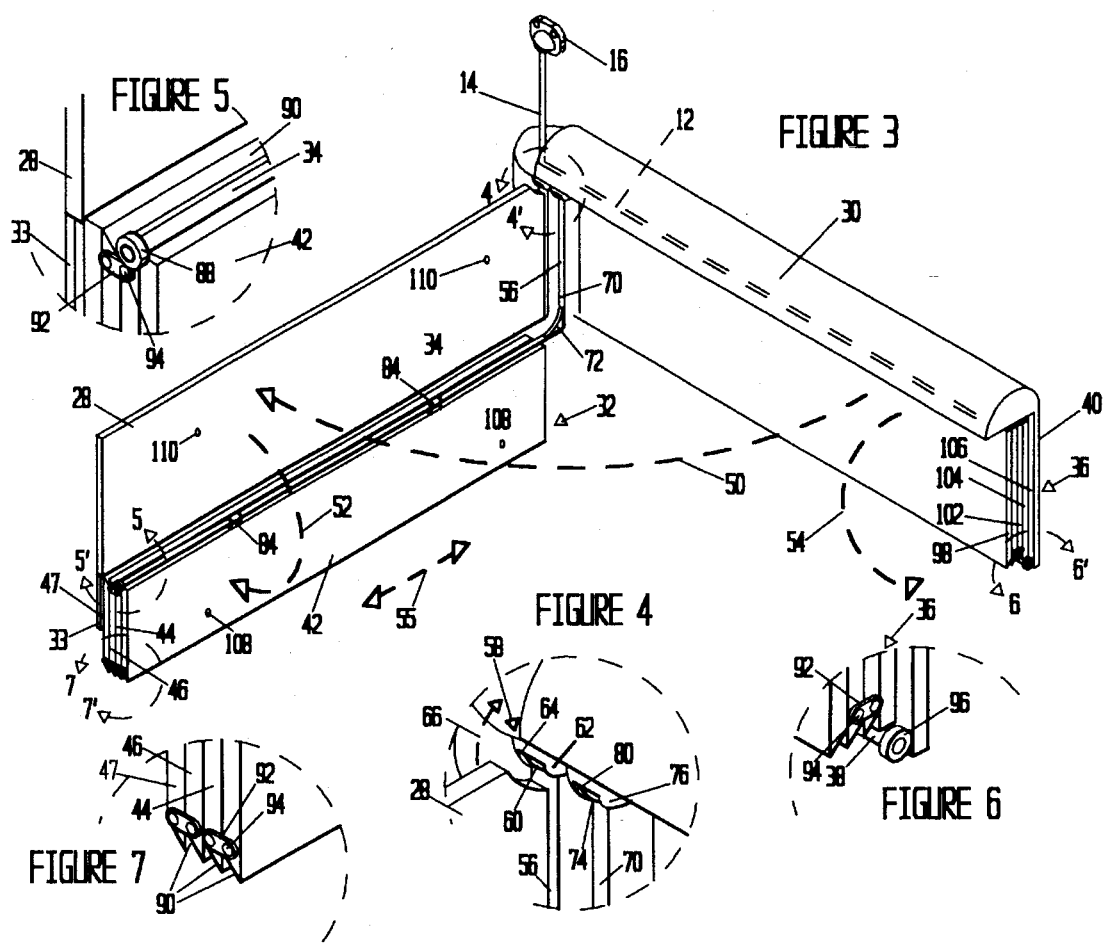

SUN VISOR WITH SUN SCREENS FOR MOTOR VEHICLE

BACKGROUND OF THE INVENTION

1. Field of Invention

This invention relates to sun visors for a motor vehicle and in particular, to an improved sun visor having one or more sun screens for a vehicle.

2. Brief Statement of the Prior Art

Motor vehicles parked in full sunlight experience a very pronounced rise in interior temperature, and this problem is accentuated by the use of expansive glass areas such as wide windshields, sunroofs and the like. Various attempts have been used to provide reflective surfaces that reflect the sun's rays and eliminate or substantially reduce this "greenhouse" effect. The most popular of these approaches has been an inexpensive foldable sun screen which is typically formed of cardboard and the like and which is unfolded and placed inside the vehicle adjacent the windshield. While these sunscreens are very popular and relatively inexpensive, they have a number of shortcomings. They are cumbersome to unfold the place them beside the windshield. The sunscreens are also bulky and difficult to store when not in use. Additionally, the screens are not readily usable for side windows of the vehicle.

Sun visors which are commonly provided in vehicles have flat, single sheet shapes and are rotatable mounted to the inside roof or upper trim above the windshield, so they can be pivoted to position the visor along the windshield or along a side window. These visors have insufficient span and do not adequately shield the driver or passenger from the sun's rays. Also, no attempt has previously been made to combine a sun visor with a sun screen.

OBJECTIVES OF THE INVENTION

It is an object of this invention to provide sun screens which readily retract into and extend from sun visors of motor vehicles.

It is a further object of this invention to provide a sun visor for a vehicle which provides substantially complete protection to front seat passengers and the driver of the vehicle.

It is also an object of this invention to provide a sun visor with an extendible sun screen which can be deployed to protect the windshield and front side windows of a vehicle.

Other and related objects of the invention will be apparent from the following description of the invention.

BRIEF DESCRIPTION OF THE INVENTION

This invention comprises a sun visor for a motor vehicle having a retractable sun screen which can be deployed beside the windshield and/or front side window, or both, of a motor vehicle. The sun visor preferably has capability of expanded width and length and can be fully retracted into the visor. The sun screens are stored in the sun visors and can be foldable into a compact storage in the visor, or can be mounted on rollers within the sun visor.

The sun screens are formed of thin film plastics, preferably of Mylar® having a thickness from 1 to about 10 mils, preferably from 2 to about 5 mils.

BRIEF DESCRIPTION OF THE FIGURES

The invention will be described with reference to the figures of which:

FIG. 3 is a perspective view of the visor embodiment of FIGS. 1 and 2, with the visors deployed beside the front side window and windshield of a vehicle;

FIG. 4 is an enlarged view of the area within line 4–4' of FIG. 3;

FIG. 5 is an enlarged view of the area within line 5–5' of FIG. 3;

FIG. 6 is an enlarged view of the area within line 6–6' of FIG. 3;

FIG. 7 is an enlarged view of the area within line 7–7' of FIG. 3;

DESCRIPTION OF PREFERRED EMBODIMENTS

Figure 1:
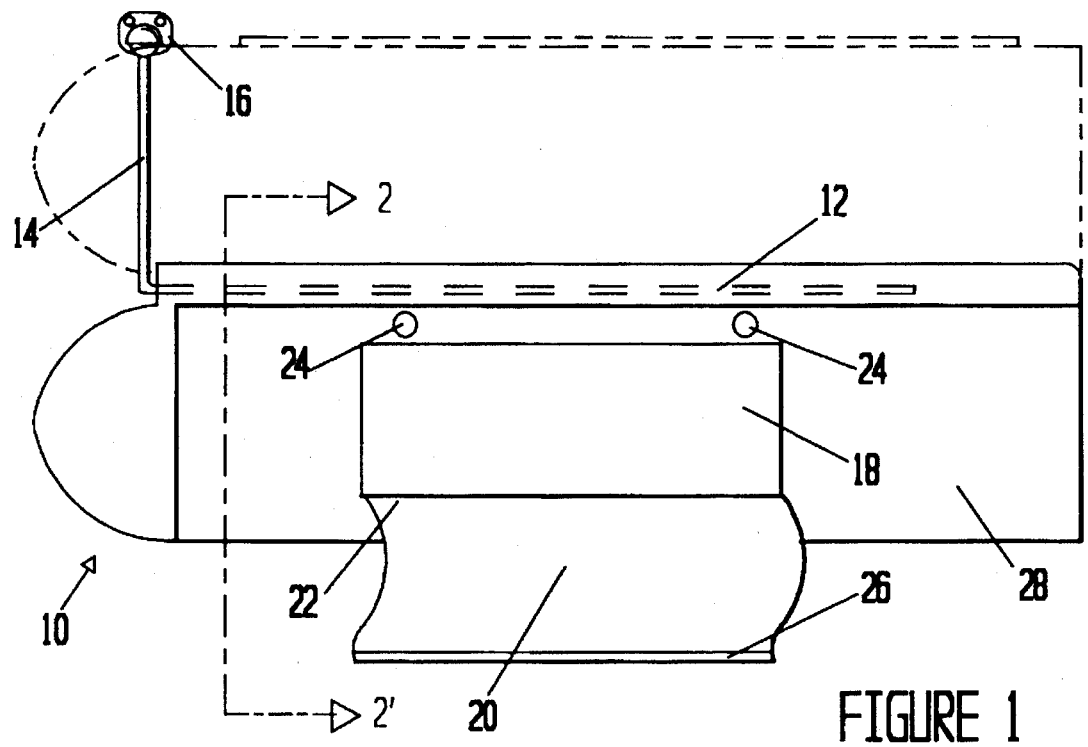
FIG. 1 is an elevational view of the preferred sun visor/sun screen of the invention.

Referring now to FIG. 1, there is illustrated a front elevational view of a sun visor 10 of the invention, as rotated down, about its support shaft 12, in a sun shielding position beside the driver's side of the vehicle windshield (not shown). As there illustrated the sun visor 10 is supported in the vehicle with a conventional support post 14 having a rotatable mounting by a mounting bracket 16 which is affixed to a support of the vehicle. The support post 14 has an integral, orthogonal arm that provides the support shaft 12 which is rotationally received within the visor 10. In FIG. 1, the visor is illustrated in a configuration which is similar to a conventional automotive visor, and can be provided with a mirror 18 that can have a removable cover such as the flexible sheet 20 which is attached to the assembly along its bottom edge 22 and which has a clasp along its upper edge to secure it in a closed position. An example of a suitable clasp comprises one or more permanent magnets 24 in the visor body 30 and with a steel strip 26 along the edge of sheet 20.

Figure 2:
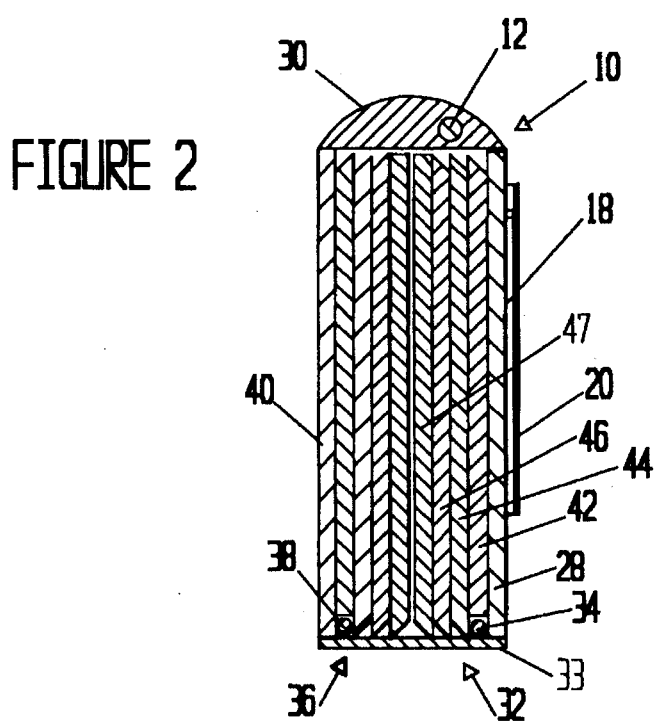
FIG. 2 is a sectional view along line 2–2' of FIG. 1.

As shown in FIG. 2, the visor 10 has a front cover 28. Cover 28 is pivotally mounted to the visor body 30 to permit the front cover 28 to be pivoted into an orthogonal position relative to the visor body, thereby locating it adjacent the front side window of the vehicle, in the manner illustrated in FIG. 3.

The visor also includes a first assembly 32 of folding panels, which are supported on a longitudinal arm 34 (shown in cross section) which is pivotally supported from the visor body 30, as described in detail with reference to FIGS. 3 and 4. The first assembly 32 of folding panels is shown in its folded or retracted configuration in FIG. 2.

A second, or main, assembly 36 of folding panels is also supported from the visor body 30 on a second longitudinal support arm 38. A stationary panel 40 depends from the visor body, and the main assembly 36 of folding panels is shown in end view in its folded or retracted configuration, beside the main stationary panel 40.

Each assembly consists of four panels such as panels 42, 44, 46 and 47 of the first assembly 32, with adjacent panels being hinged together along their longitudinal edges in the manner illustrated in FIGS. 3 and 5–7, thereby permitting the assemblies to be folded into the compact configuration shown in FIGS. 1 and 2.

Preferably, the bottom of the visor assembly has a cover 33, which can be a flexible cloth cover, or a stiff, hinged cover which is attached to the upper edge of the visor in its raised position shown in broken lines in FIG. 1.

Referring now to FIG. 3, the cover 28 and first assembly 32 are shown deployed orthogonally to the visor body 30, to locate it beside the front, left-side window, as indicated by the broken arrowhead line 50. The main assembly 36 remains beside the windshield of the vehicle. The first assembly 32 is also pivoted downwardly on its support arm 34, as indicated by the broken arrowhead line 52. In this position, the sun visor main assembly 36 protects the driver's vision from blinding sun through the windshield, and the cover 28 and first assembly 32 protect against sunlight through the front left-side window.

As shown in FIG. 4, the cover 28 is supported by an arm 56 which is pivotally secured in a ball and socket joint 58. The arm 56 has a distal ball 60 which is received in the socket 62 of an attachment bracket. Preferably, the socket 62 also has a cross slot 64 which permits the arm 56 to pivot in an plane which is orthogonal to the visor body 30, as shown by broken arrowhead line 66. This permits the visor body 30 to be tilted forward or back on its support arm 12, while still maintaining the cover 28 in its illustrated, substantially horizontal orientation beside the side window of the vehicle.

As shown in FIG. 3, the first assembly 32 of panels is slidably and rotationally supported on longitudinal arm 34 which has a 90 degree bend with a short vertical leg 70. Preferably, a fillet bracket 72 is provided to increase the rigidity of the support arm. The vertical leg 70 has a distal ball 74 which is received in the socket 76 of a second ball and socket joint 78 (see FIG. 4). This socket 76 also has a cross slot 80 which permits tilting of the main visor body 30 without changing the orientation of the first assembly 32 of panels.

The uppermost panel 42 in the first assembly 32 has a plurality of sleeve brackets 84 attached at spaced-apart locations along its upper edge 86, and the sleeves of these brackets receive the support arm 34, thereby providing a slidable and rotatable attachment of the assembly 32 to the support arm 34.

As shown in FIG. 5, the end of the support arm 34 receives a ring 88 which is permanently secured to the arm 34 to serve as a stop to retain the assembly 32 of panels on the arm 34.

Each of the panels, 42, 44, 46 and 47, is preferably provided with beveled, longitudinal edges 90, and the adjacent panels are hinged together by links 92 which are secured between the ends of adjacent panels by pins 94 or screw fasteners. The links 92 loosely receive the shafts of the pins 94 to permit rotation of the adjacent panels into the unfolded configuration shown in FIG. 8.

Referring now to FIG. 6, the main assembly 36 of panels has a support arm 38 with a ring stop 96 similar to that described with reference to FIG. 5. The main assembly 36 of panels is shown in FIGS. 3 and 6 in its folded or retracted configuration, received beside the main stationary panel of the visor.

The panels are also provided with retention means to maintain them in any degree of expansion. While various detents can be provided in the hinges, it is preferred to provide magnetic means such as a permanent magnet 108 mounted in one screen in a position to register against a second permanent magnet, or a magnetic armature 110 (steel plug) in the adjacent panel, when the two panels are folded together. A similar arrangement of permanent magnets or one magnet 108 and an armature 110 can be provide in the front cover 28 and first panel 42 to retain the assembly 32 in its folded configuration shown in FIGS. 1 and 2. A similar arrangement of permanent magnets and armatures is provided in the main assembly 36 of panels to retain the latter in their folded configuration.

Figure 8:
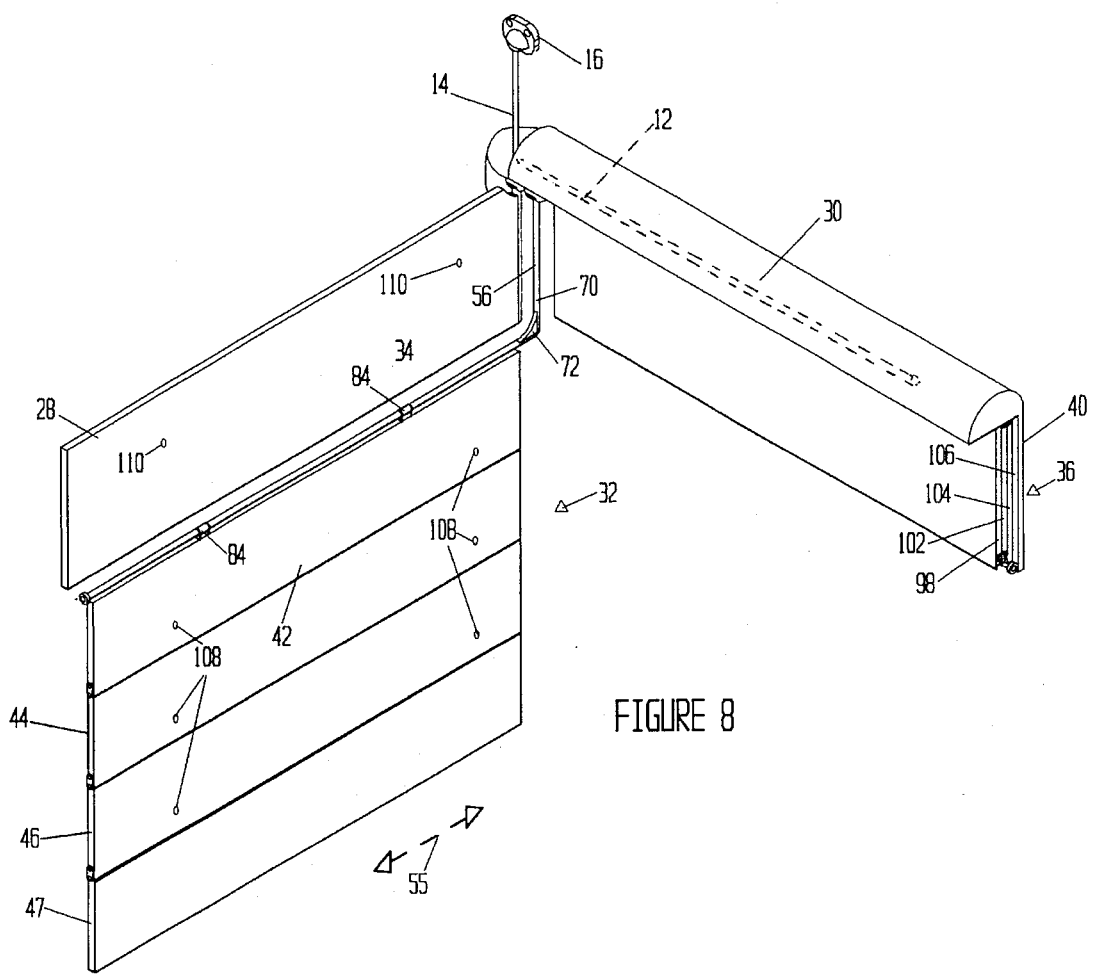
FIG. 8 is a perspective view of the visor of FIGS. 1 and 3, with the sun screen panels in their unfolded configuration.

As shown in FIG. 8, the individual panels of each assembly can be unfolded into their deployed configuration, with the panels 42, 44, 46 and 47 of the first assembly 32 unfolded adjacent the front left-side window. The panels 98, 102,104 and 106 of the main assembly 36 are shown in a folded configuration, adjacent the windshield of the vehicle. The panels thus offer substantially complete sun blockage for the protected areas of the windshield and the front side window.

The sunscreen panels can be formed of thin film plastic, or can be molded of plastics. A very suitable material is polyester (Mylar®) which is available in films and sheets of varied thicknesses. A very suitable thickness is from 0.002 to about 0.02 inch, which provides sufficient strength and durability to the assembly.

Figure 9:
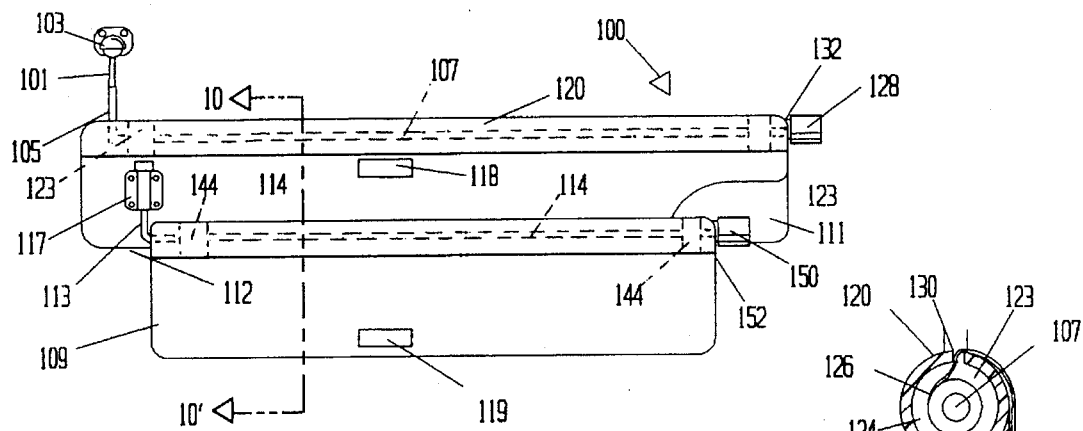
FIG. 9 is an elevational view of a visor embodiment of the invention which has a retractable sun screen.

FIG. 9 illustrates an alternative embodiment of a sun visor 100 which includes a sun screen. The sun visor 100 is mounted to the vehicle with a support post 101 that is pivotally secured in the vehicle with a pivotal joint such as a ball and socket joint 103. Support post 101 has a right angle arm 105 with a longitudinal section 107 that is received within the visor to provide a rotatable support for the visor, as in a conventional visor. The visor of this invention, also includes a lowermost panel 109 which is secured to the visor 100 with a second support post 113 which is received in a mounting bracket 117 to the main visor 100. The support post 113 has a right angle arm 114 that is rotatably received within the lowermost panel 109. A third panel 111 is slidably received within visor 100.

Figure 11:
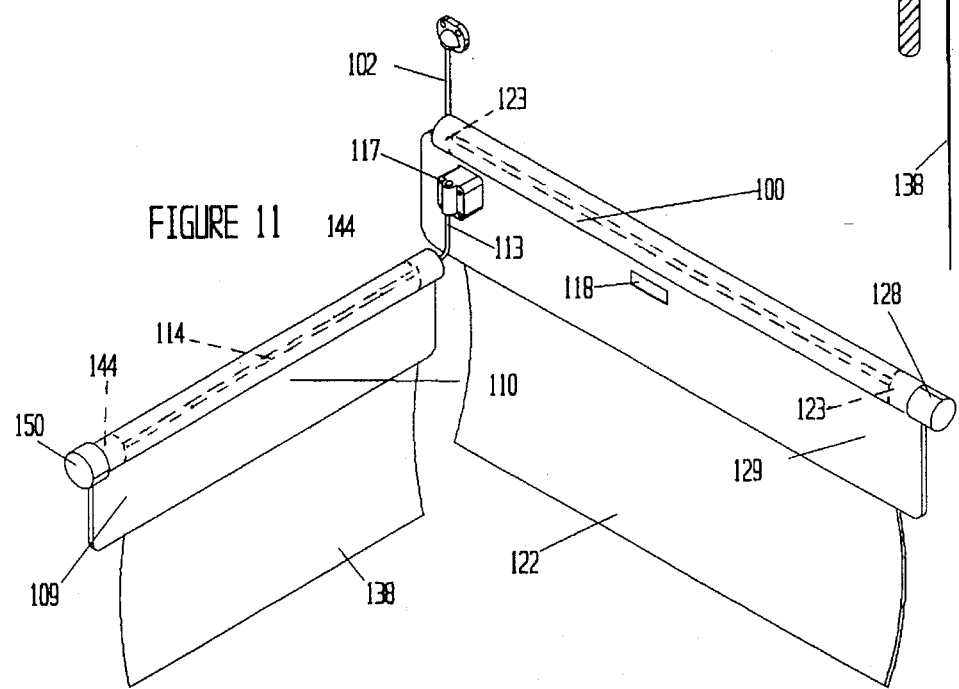
FIG. 11 illustrates deployment of the sun visor and sun screens of the embodiment of FIG. 9 beside the windshield and front side window of a vehicle.

As shown in FIGS. 9 and 11, the visor 100 and the lowermost panel 109 can be swung down to their illustrated positions. The lowermost panel can also be rotated to an orthogonal position, as shown in FIG. 11, so that it is deployed beside the front side window, while the main visor 100 remains deployed beside the windshield.

Figure 10:
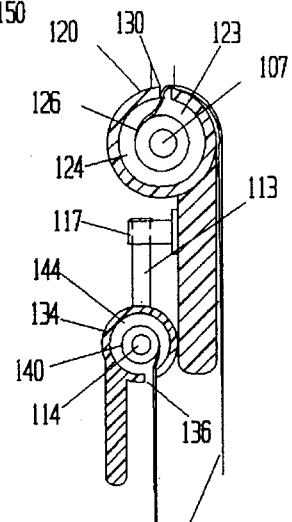
FIG. 10 is an end view of the sun visor of FIG. 9, illustrating deployment of the retractable sun visors.

Referring now to FIG. 10, there is illustrated a sectional view along line 10–10' of FIG. 11. The visor 100 has an upper hollow cylindrical edge 120 with a central longitudinal cavity 124. A roller 126 is rotationally supported in the cavity 124, coaxial with arm 107, and a sun screen 122 is secured to the roller. Ring spacers 123 are rotationally mounted on opposite ends of roller 126 between support shaft 107 and the internal side wall of the cylindrical edge 120 to provide rotational support of the panel of visor 100. The sun screen 122 extends out of the cylindrical edge 120 through a slot 130 which is opposite from the panel of visor 100. As the roller is rotated, it extends or retracts the sun screen 122. The roller can have an actuator knob 128 mounted on the end of the roller, projecting beyond the edge 132 of the panel of visor 100, as shown in FIG. 9.

The lowermost panel 109 is similarly provided with a cylindrical edge 134 which has a longitudinal slot 136 through which extends a sun screen 138. The sun screen is rolled onto a roller 140 internally received within the cylindrical edge 134. Ring spacers 144 are rotationally mounted on opposite ends of roller 140 between the internal side wall of the cylindrical edge 134 and support shaft 116, to provide rotational support of the lowermost panel 109. An actuator knob 150 is mounted on the end of the roller 140, projecting beyond the edge 152 of the panel 109, as shown in FIG. 9.

The sun screens can be formed of a suitable thin film plastic, such as polyethylene, polypropylene, polyvinyl chloride, etc. Preferably the sunscreens are formed of Mylar® (polyester) film, having a thickness from about 1 to about 5 mils. The sun screens preferably are provided with highly reflective surfaces, e.g., colors or opaque additives can be incorporated in the plastic, or the surfaces of the plastic film can be metallized to provide maximum heat and radiation reflective properties.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. A sun visor supported by a first pivotal support post adapted to be permanently secured to a frame surrounding a windshield of a motor vehicle having a side window, said first pivotal support post having an orthogonal arm, said sun visor including a first flat, elongated panel to extend to approximately the midpoint of said windshield and having a longitudinal upper edge with a central longitudinal cavity open along a longitudinal slot extending along one side thereof, with said orthogonal arm rotationally supported within said cavity, a roller bar rotationally supported on said orthogonal arm, and coextensive with, said longitudinal cavity; a sun screen formed of a thin film, flexible plastic sheet extending through said longitudinal slot and rolled up on said roller bar, said sun screen having a width substantially equal to the length of said slot, and actuator means on the end of said roller, and exterior of said cavity, whereby said sun screen can be extended from, and retracted into, said cavity by rotation of said roller bar, a second pivotal support post secured to said first panel beneath and adjacent to said first pivotal support post and having a panel orthogonal arm which extends coextensively along the bottom edge of said first panel, and a second flat elongated panel pivotally secured about said panel orthogonal arm of said second pivotal support post by a tubular sleeve secured along the upper edge of said second panel, with said sleeve being slidably received over the orthogonal arm of said second pivotal support post, thereby permitting the sliding extension of said second panel from said second pivotal support post, whereby said second panel can be unfolded to a position extending beneath and along the bottom edge of said first panel, or can be pivoted to a second position at a right angle to said first panel and can be slidably extended in either position, whereby said second panel may be placed beside, and slidably extended along, the side window of said car while said first panel remains beside the windshield of said motor vehicle.

2. The sun visor of claim 1 wherein said screen is formed of polyester film.

3. The sun visor of claim 1 including a third panel slidably received within said first panel and extendible from the end thereof opposite said first pivotal support post.

4. A sun visor supported by a first pivotal support post adapted to be permanently secured to a frame surrounding a windshield of a motor vehicle, said first pivotal support post having an orthogonal arm, said sun visor including:

a. a first generally flat, elongated panel to extend to approximately the midpoint of said windshield and having a longitudinal upper edge with a central longitudinal cavity open along a longitudinal slot extending along one side thereof, with said orthogonal arm pivotally received within said cavity;

b. a roller bar rotationally supported on said orthogonal arm, and coextensive with, said longitudinal cavity;

c. a sun screen formed of a thin film, flexible plastic sheet extending through said longitudinal slot and rolled up on said roller bar, said sun screen having a width substantially equal to the length of said slot, and d. actuator means on the end of said roller, and exterior of said cavity, whereby said sun screen can be extended from, and retracted into, said cavity by rotation of said roller bar.

\* \* \* \* \*